(12) United States Patent
Bossolo et al.

(10) Patent No.: US 12,152,097 B2
(45) Date of Patent: Nov. 26, 2024

(54) FLUOROELASTOMER COMPOSITION FOR HIGH THERMAL RATING

(71) Applicant: SOLVAY SPECIALTY POLYMERS ITALY S.P.A., Bollate (IT)

(72) Inventors: Stefano Bossolo, Parabiago (IT); Claudia Manzoni, Bologna (IT); Matteo Fantoni, Vanzaghello (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 680 days.

(21) Appl. No.: 17/297,025

(22) PCT Filed: Dec. 2, 2019

(86) PCT No.: PCT/EP2019/083319
§ 371 (c)(1),
(2) Date: May 26, 2021

(87) PCT Pub. No.: WO2020/114972
PCT Pub. Date: Jun. 11, 2020

(65) Prior Publication Data
US 2021/0395416 A1 Dec. 23, 2021

(30) Foreign Application Priority Data
Dec. 6, 2018 (EP) .................................. 18210792

(51) Int. Cl.
*C08F 214/26* (2006.01)
*C08K 5/00* (2006.01)

(52) U.S. Cl.
CPC ........ *C08F 214/262* (2013.01); *C08K 5/0025* (2013.01); *C08F 2800/10* (2013.01); *C08F 2810/20* (2013.01)

(58) Field of Classification Search
None
See application file for complete search history.

(56) References Cited

U.S. PATENT DOCUMENTS

| 4,281,092 A | 7/1981 | Breazeale |
| 5,447,993 A | 9/1995 | Logothetis |
| 5,789,489 A | 8/1998 | Coughlin et al. |
| 8,362,167 B2 * | 1/2013 | Andreevich ............. C08K 5/29 564/243 |
| 2008/0064820 A1 * | 3/2008 | Kawasaki ............... C08L 27/12 525/326.3 |
| 2014/0114009 A1 * | 4/2014 | Fantoni ............... C08F 214/262 526/247 |

FOREIGN PATENT DOCUMENTS

| EP | 0860436 A1 * | 2/1998 | ......... C07D 251/24 |
| EP | 1153976 A1 | 11/2001 | |
| WO | 9502634 A1 | 1/1995 | |
| WO | 03050150 A1 | 6/2003 | |
| WO | 2012168351 A1 | 12/2012 | |

OTHER PUBLICATIONS

Standard ASTM D4440-08—Standard Test Method for Plastics: Dynamic Mechanical Properties Melt Rheology, 2008, pp. 1-5.

* cited by examiner

*Primary Examiner* — Anthony J Frost
(74) *Attorney, Agent, or Firm* — Osha Bergman Watanabe & Burton LLP

(57) ABSTRACT

The invention pertains to a fluoroelastomer having a branched structure including long chain branches and including cure-site monomers, and curable composition thereof, able to provide for cured parts having ability to retain outstanding sealing performances at very high temperatures, up to about 350° C., to a method of curing the same and to cured articles obtained therefrom, which are notably useful as sealing parts in semi-conductors industry.

18 Claims, No Drawings

FLUOROELASTOMER COMPOSITION FOR HIGH THERMAL RATING

CROSS-REFERENCE TO RELATED APPLICATION

This application is a U.S. national stage entry under 35 U.S.C. § 371 of International Application No. PCT/EP2019/083319 filed Dec. 2, 2019, which claims priority to European Patent Application No. 18210792.0, filed on Dec. 6, 2018. The entire contents of these applications are explicitly incorporated herein by this reference.

TECHNICAL FIELD

The invention pertains to a fluoroelastomer and curable composition thereof able to provide for cured parts having ability to retain outstanding sealing performances at very high temperatures, up to about 350° C., to a method of curing the same and to cured articles obtained therefrom, which are notably useful as sealing parts in semi-conductors industry.

BACKGROUND ART

Fluoroelastomers, and more specifically tetrafluoroethylene-based fluoroelastomers, have long been used in a variety of applications that require excellent resistance to several rash conditions, including high temperature, chemical attack, and exposure to plasma, including in particular in the semi-conductors' manufacturing industry. Especially in this area, the possibility of providing cured parts having ability to withstand routinely temperatures as high as 320-330° C., and up to about 350° C., and yet possessing all other advantageous attributes of perfluororubbers, is a long-felt need in this area.

SUMMARY OF INVENTION

A first object of the invention is hence a (per)fluoroelastomer [fluoroelastomer (A)] having a branched structure including long chain branches, said fluoroelastomer (A) comprising:
recurring units derived from tetrafluoroethylene (TFE); and
from 0.1 to 10.0% moles, with respect to total moles of recurring units of (per)fluoroelastomer (A), of recurring units derived from at least one of:
cure-site containing monomers having at least a nitrile group [monomer (CS-N)];
cure-site containing monomers having at least a carbo-group [monomer (CS-C)] selected from the group consisting of carboxylic groups —COOH; carboxylate groups —COOX$_a$, with X$_a$ being a monovalent metal or an ammonium group; carboxamide group —CONH$_2$; and alkoxycarboxylic group —COO—R$_H$, with R$_H$ being a (fluoro)(hydro)carbon group, preferably a C$_1$-C$_3$ alkyl group; and
possessing an amount of long chain branches so that the ratio G'$_{0.1}$/G'$_1$ satisfies the following inequality:

$$1.75 \leq G'_{0.1}/G'_1 \leq 2.25$$

wherein:
G'$_{0.1}$ and G'$_1$ are the values of the storage modulus, as measured by dynamic rheology at a temperature of 140° C. according to ASTM D4440 at a shear rate, respectively, of 0.1 rad/sec and 1 rad/sec.

The Applicant has surprisingly found that fluoroelastomer (A), as described above, possessing the said peculiar rheological behaviour, representative of the presence of a well-defined concentration of long chain branches, can be cured so as to deliver cured parts possessing a significantly improved thermal resistance, so as to ensure maintenance of all advantageous fluororubber attributes up to temperatures of 350° C., so as to be suitable for continued use beyond 320° C.

DETAILED DESCRIPTION OF THE INVENTION

For the purposes of this invention, the term "(per)fluoroelastomer" [fluoroelastomer (A)] is intended to designate a fluoropolymer resin serving as a base constituent for obtaining a true elastomer, said fluoropolymer resin comprising more than 10% wt, preferably more than 30% wt, of recurring units derived from at least one ethylenically unsaturated monomer comprising at least one fluorine atom (hereafter, (per)fluorinated monomer) and, optionally, recurring units derived from at least one ethylenically unsaturated monomer free from fluorine atom (hereafter, hydrogenated monomer).

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Among cure-site containing monomers of type (CS-N), as above detailed, comprised in fluoroelastomer (A), preferred monomers are (per)fluorinated and are especially those selected from the group consisting of:
(CS-N1) perfluorovinyl ethers containing nitrile groups of formula CF$_2$=CF—[OCF$_2$CFX$^{CN}$(CF$_2$)$_{a1}$]$_m$—O—(CF$_2$)$_n$—CN, with X$^{CN}$ being F or CF$_3$, a1 being 0, 1 or 2; m being 0, 1, 2, 3 or 4; n being an integer from 1 to 12;
(CS-N2) perfluorovinyl ethers containing nitrile groups of formula CF$_2$=CF—(OCF$_2$CFX$^{CN}$(CF$_2$)$_{a2}$)$_{m'}$—O—CF$_2$—CF(CF$_3$)—CN, with X$^{CN}$ being F or CF$_3$, a2 being 0, 1 or 2; m' being 0, 1, 2, 3 or 4.

Specific examples of cure-site containing monomers of type CS—N1 and CS—N2 suitable to the purposes of the present invention are notably those described in U.S. Pat. No. 4,281,092 (DU PONT) 28 Jul. 1981, U.S. Pat. No. 4,281,092 (DU PONT) 28 Jul. 1981, U.S. Pat. No. 5,447,993 (DU PONT) May 9, 1995 and U.S. Pat. No. 5,789,489 (DU PONT) Apr. 8, 1998.

Preferred cure-site monomers (CS-N) are notably perfluoro(8-cyano-5-methyl-3,6-dioxa-1-octene) of formula: CF$_2$=CF—O—CF$_2$—CF(CF$_3$)—O—CF$_2$—CF$_2$—CN (8-CNVE) and the monomer of formula CF$_2$=CF—O—CF$_2$—CF$_2$—CF$_2$—O—CF$_2$—CF(CF$_3$)—CN. Most preferably, monomer (CS-N) is 8-CNVE, as described above. When increased chemical resistance is required, monomer of formula CF$_2$=CF—O—CF$_2$—CF$_2$—CF$_2$—O—CF$_2$—CF(CF$_3$)—CN may be most preferred.

Among cure-site containing monomers of type (CS-C), as above detailed, comprised in fluoroelastomer (A), preferred monomers are (per)fluorinated and are especially those selected from the group consisting of:
(CS-C1) perfluorovinyl ethers containing carbo-groups of formula CF$_2$=CF—(OCF$_2$CFX$^C$)$_m$—O—(CF$_2$)$_n$—R$_{COX}$, with X$^C$ being F or CF$_3$, m being 0, 1, 2, 3 or 4; n being an integer from 1 to 12, and R$_{COX}$ being selected from the group consisting of carboxylic groups —COOH; carboxylate groups —COOX$_a$, with X$_a$ being a monovalent metal or an ammonium group; carboxamide group —CONH$_2$; and alkoxycarboxylic group —COO—R$_H$, with R$_H$ being a (fluoro)(hydro) carbon group, preferably a C$_1$-C$_3$ alkyl group;

(CS-C2) perfluorovinyl ethers containing carbo-groups of formula CF$_2$=CF—(OCF$_2$CFX$^C$)$_m$—O—CF$_2$—CF(CF$_3$)—R$_{COX}$, with m' being 0, 1, 2, 3 or 4, and X$^C$ and R$_{COX}$ having the meaning as defined for (CSC-1).

It is nevertheless generally preferred for fluoroelastomer (A) to comprise recurring units derived from cure-site containing monomers of type (CS-N), as above detailed, i.e. for fluoroelastomer (A) to be a nitrile-curable compound. More preferably, fluoroelastomer (A) will comprise recurring units derived from monomer of formula CF$_2$=CF—O—CF$_2$—CF(CF$_3$)—O—CF$_2$—CF$_2$—CN (8-CNVE) and/or from monomer of formula CF$_2$=CF—O—CF$_2$—CF$_2$—CF$_2$—O—CF$_2$—CF(CF$_3$)—CN.

Generally fluoroelastomer (A) comprises recurring units derived from at least one (per)fluorinated monomer, in addition to recurring units derived from tetrafluoroethylene, and recurring units derived from monomer (CS-N) and/or (CS-C), as above detailed, wherein said (per)fluorinated monomer is generally selected from the group consisting of:
C$_3$-C$_8$ perfluoroolefins, such as notably hexafluoropropene (HFP);
C$_2$-C$_8$ hydrogen-contaning fluoroolefins, such as vinyl fluoride; 1,2-difluoroethylene, vinylidene fluoride (VDF), trifluoroethylene (TrFE), pentafluoropropylene, and hexafluoroisobutylene;
(per)fluoroalkylethylenes complying with formula CH$_2$=CH—R$_{f0}$, in which R$^{f0}$ is a C$_1$-C$_6$ (per)fluoroalkyl or a C$_1$-C$_6$ (per)fluorooxyalkyl having one or more ether groups;
chloro- and/or bromo- and/or iodo-containing C$_2$-C$_6$ fluoroolefins, such as chlorotrifluoroethylene (CTFE);
(per)fluoroalkylvinylethers complying with formula CF$_2$=CFOR$_{f1}$ in which R$_{f1}$ is a C$_1$-C$_6$ fluoro- or perfluoroalkyl, e.g. —CF$_3$, —C$_2$F$_5$, —C$_3$F$_7$;
(per)fluoro-oxyalkylvinylethers complying with formula CF$_2$=CFOX$_0$, in which X$_0$ is a C$_1$-C$_{12}$ (per)fluorooxyalkyl having one or more ether groups; in particular (per)fluoro-methoxy-vinylethers complying with formula CF$_2$=CFOCF$_2$OR$_{f2}$ in which R$_{f2}$ is a C$_1$-C$_6$ fluoro- or perfluoroalkyl, e.g. —CF$_3$, —C$_2$F$_5$, —C$_3$F$_7$ or a C$_1$-C$_6$ (per)fluorooxyalkyl having one or more ether groups, like —C$_2$F$_5$—O—CF$_3$;
(per)fluorodioxoles, of formula:

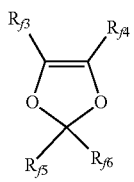

wherein each of R$_{f3}$, R$_{f4}$, R$_{f5}$, R$_{f6}$, equal to or different from each other, is independently a fluorine atom, a C$_1$-C$_6$ fluoro- or per(halo)fluoroalkyl, optionally comprising one or more oxygen atom, e.g. —CF$_3$, —C$_2$F$_5$, —C$_3$F$_7$, —OCF$_3$, —OCF$_2$CF$_2$OCF$_3$.

It may happen for fluoroelastomer (A) to include recurring units derived from fluorine-free monomers, which will be hereunder referred to as hydrogenated monomers. Examples of hydrogenated monomers are notably hydrogenated alpha-olefins, including ethylene, propylene, 1-butene, diene monomers, styrene monomers, alpha-olefins being typically used.

Fluoroelastomers (A) are in general amorphous products or products having a low degree of crystallinity (crystalline phase less than 20% by volume) and a glass transition temperature (T$_g$) below room temperature. In most cases, the fluoroelastomer (A) has advantageously a T$_g$ below 10° C., preferably below 5° C., more preferably 0° C.

The fluoroelastomer (A) is preferably selected among TFE-based copolymers, comprising recurring units derived from TFE, recurring units derived from monomer (CS-N) and/or monomer (CS-C), as above detailed, and recurring units derived from at least one additional fluorinated comonomer selected from the group consisting of:
(a) C$_3$-C$_8$ perfluoroolefins, such as hexafluoropropylene (HFP);
(b) C$_2$-C$_8$ fluoroolefins comprising at least one of iodine, chlorine and bromine, such as chlorotrifluoroethylene (CTFE);
(d) (per)fluoroalkylvinylethers (PAVE) of formula CF$_2$=CFOR$_f$, wherein R$_f$ is a C$_1$-C$_6$ (per)fluoroalkyl group, preferably CF$_3$, C$_2$F$_5$, C$_3$F$_7$;
(e) (per)fluoro-oxy-alkylvinylethers of formula CF$_2$=CFOX, wherein X is a C$_1$-C$_{12}$ (per)fluoro-oxyalkyl comprising catenary oxygen atoms, e.g. the perfluoro-2-propoxypropyl group; among these monomers, preferred are (e') (per)fluoro-methoxyvinylethers (MOVE, hereinafter) having formula:

$$CF_2=CFOCF_2OR_{f2}$$

wherein R$_{f2}$ is selected from the group consisting of C$_1$-C$_6$ (per)fluoroalkyls; C$_5$-C$_6$ cyclic (per)fluoroalkyls; and C$_2$-C$_6$ (per)fluorooxyalkyls, comprising at least one catenary oxygen atom; R$_{f2}$ is preferably —CF$_2$CF$_3$ (MOVE1); —CF$_2$CF$_2$OCF$_3$ (MOVE2); or —CF$_3$ (MOVE3);
(f) (per)fluorodioxoles having formula:

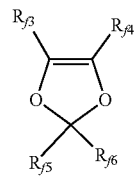

wherein each of R$_{f3}$, R$_{f4}$, R$_{f5}$, R$_{f6}$, equal to or different from each other, is independently selected from the group consisting of fluorine atom and C$_1$-C$_6$ (per)fluoroalkyl groups, optionally comprising one or more than one oxygen atom, such as notably —CF$_3$, —C$_2$F$_5$, —C$_3$F$_7$, —OCF$_3$, —OCF$_2$CF$_2$OCF$_3$; preferably, perfluorodioxoles.

More preferably, fluoroelastomer (A) is selected from the group consisting of TFE-based copolymers, comprising recurring units derived from TFE, recurring units derived from monomer (CS-N) and/or monomer (CS-C), as above detailed, and recurring units derived from at least one additional fluorinated comonomer selected from the group consisting of:
(a1) hexafluoropropylene (HFP);
(d1) perfluoroalkylvinylethers (PAVE) of formula CF$_2$=CFOR$^1_f$, wherein R$^1_f$ is a C$_1$-C$_3$ perfluoroalkyl group, preferably CF$_3$, C$_2$F$_5$, C$_3$F$_7$;

(e1) perfluoro-oxy-alkylvinylethers of formula $CF_2=CFOX$, wherein X is a $C_1$-$C_{12}$ perfluoro-oxyalkyl comprising catenary oxygen atoms; and more preferably (e'1) perfluoro-methoxy-vinylethers (MOVE, hereinafter) having formula: $CF_2=CFOCF_2OR^1_{f2}$ wherein $R^1_{f2}$ is selected from the group consisting of $C_1$-$C_3$ perfluoroalkyls; and $C_2$-$C_6$ perfluorooxyalkyls, comprising at least one catenary oxygen atom; $R^1_{f2}$ is preferably selected from $-CF_2CF_3$; $-CF_2CF_2OCF_3$; or $-CF_3$.

As said, fluoroelastomer (A) comprises long chain branches, in an amount such that the ratio $G'_{0.1}/G'_1$ satisfies the following inequality:

$$1.75 \leq G'_{0.1}/G'_1 \leq 2.25$$

wherein:

$G'_{0.1}$ and $G'_1$ are the values of the storage modulus, as measured by dynamic rheology at a temperature of 140° C. according to ASTM D4440 at a shear rate, respectively, of 0.1 rad/sec and 1 rad/sec.

It is well recognized in the art that dynamic rheology is a widely recognized technique whose measured parameters are particularly sensitive to the concentration of long chain branches in a polymer. In particular, while substantially linear polymer materials are endowed with higher slopes of G' as a function of shear rate in the low-shear region (i.e. higher values of $G'_{0.1}/G'_1$), representative of longer relaxation times, polymer materials possessing significantly branched structure have a flatter slope in the same region (i.e. higher values of $G'_{0.1}/G'_1$), representative of shorter relaxation times.

In the present case, fluoroelastomer (A) possesses an amount of long chain branches such that the ratio $G'_{0.1}/G'_1$ is comprised in the afore-mentioned range, corresponding to a relatively low, but non-zero, concentration of long chain branches.

The Applicant has surprisingly found that "linear" fluoroelastomers, otherwise substantially similar to fluoroelastomers (A) of the present invention, or fluoroelastomers possessing lower amount of branches, so endowed with a ratio $G'_{0.1}/G'_1$ exceeding 2.25, are not possessing the very advantageous thermal behaviour which is hereby sought; still, surprisingly, fluoroelastomers otherwise substantially similar to fluoroelastomer (A), but endowed with a ratio $G'_{0.1}/G'_1$ of less than 1.75, equally fail to deliver the sought thermal rating, which is among the advantageous attributes of the present inventive fluoroelastomers (A).

Preferably, fluoroelastomer (A) comprises long chain branches, in an amount such that the ratio $G'_{0.1}/G'_1$ is of at least 1.80, more preferably of at least 1.85 and/or of at most 2.20, more preferably at most 2.15.

The expression "long chain branches" is hereby understood according to its usual meaning, which is well understood by one of ordinary skills in the art. In general terms, fluoroelastomer (A) is understood as a polymer composed of a sequence of repeating units connected through carbon-carbon bonds. While most of these repeating units form a main straight chain, a fraction of the same may branch off from the said main chain, forming a branched sequence of repeating units, which is generally referred to a long chain branch, notably as opposed to short chain branches represented by the side-groups/substituents bound to the catenary carbon atoms of the repeating units.

Long chain branches of fluoroelastomer (A) are branches composed of sequences of same recurring units described above for fluoroelastomer (A).

Long chain branches of fluoropolymer (A) are generally formed during polymerization, although methods based on grafting of branches on already polymerized linear precursors may be equally found effective.

Methods of forming long chain branches during polymerization of fluoroelastomer (A) are not particularly limited; mention can be notably made of random re-incorporation of in-situ formed linear precursors possessing ethylenically unsaturated double bounds; radical chain transfer to in-situ formed linear precursors possessing radically-sensitive; incorporation of polyunsaturated branching monomers.

It is nevertheless generally understood that among different means for introducing long chain branches, polymerization methods including incorporation of recurring units derived from polyunsaturated branching monomers is the preferred route for carefully controlling the concentration of so-branched off long chain branches.

Hence, preferred embodiments are those wherein fluoroelastomer (A) includes recurring units derived from polyunsaturated branching monomers, which are advantageously selected from the group consisting of monomers comprising at least two ethylenically unsaturated double bonds, and most preferably from the group consisting of monomers comprising two ethylenically unsaturated double bonds.

According to these preferred embodiments, the fluoroelastomer (A) of the present invention comprises recurring units derived from a bis-olefin [bis-olefin (OF)] having general formula:

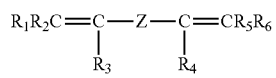

wherein $R_1$, $R_2$, $R_3$, $R_4$, $R_5$ and $R_6$, equal or different from each other, are independently selected from the group consisting of F, Cl, H, $C_1$-$C_5$ (fluoro)alkyl groups, and groups $-OR_B$, wherein $R_B$ is a branched or straight chain alkyl radical which can be partially, substantially or completely fluorinated or chlorinated; Z is a linear or branched $C_1$-$C_{18}$ (hydro)carbon radical (including alkylene or cycloalkylene radical), optionally containing oxygen atoms, preferably at least partially fluorinated, or a (per)fluoro(poly)oxyalkylene radical comprising one or more catenary ethereal bonds.

The bis-olefin (OF) is preferably selected from the group consisting of those complying with formulae (OE-1), (OF-2) and (OE-3):

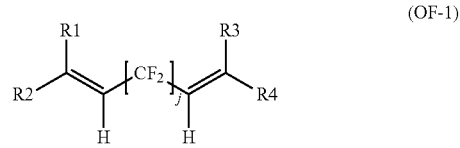

wherein j is an integer between 2 and 10, preferably between 4 and 8, and R1, R2, R3, R4, equal or different from each other, are H, F or $C_{1-5}$ alkyl or (per)fluoroalkyl group;

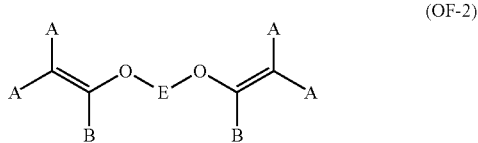

(OF-2)

wherein each of A, equal or different from each other and at each occurrence, is independently selected from F, Cl, and H; each of B, equal or different from each other and at each occurrence, is independently selected from F, Cl, H and OR$_B$, wherein R$_B$ is a branched or straight chain alkyl radical which can be partially, substantially or completely fluorinated or chlorinated; E is a divalent group having 2 to 10 carbon atom, optionally fluorinated, which may be inserted with ether linkages; preferably E is a —(CF$_2$)$_m$— group, with m being an integer from 3 to 5; a preferred bis-olefin of (OF-2) type is F$_2$C=CF—O—(CF$_2$)$_5$—O—CF=CF$_2$.

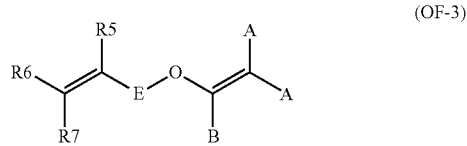

(OF-3)

wherein E, A and B have the same meaning as above defined; R5, R6, R7, equal or different from each other, are H, F or C$_{1-5}$ alkyl or (per)fluoroalkyl group.

Most preferably, bis-olefin (OF) is a bis-olefin of formula (OE-1), as above detailed, and most preferably it is divinylperfluorohexane.

For embodiments wherein the fluoroelastomer (A) comprises recurring units derived from a bis-olefin (OF), as detailed above, the amount of the said bis-olefin (OF) is generally of at least 0.04, preferably of at least 0.05 and/or of at most 0.25, preferably of at most 0.20% moles, with respect to the total moles of recurring units of fluoroelastomer (A). This being said, because detection of such low amounts of branching monomer could be quite challenging from analytical perspective, the determination of the ratio G'$_{0.1}$/G'$_1$ as detailed above is a more reliable and precise characterization for defining the low but non-zero long branching concentration in fluoroelastomer (A).

Exemplary preferred fluoroelastomers (A) which can be used in the composition of the present invention are those having following monomers composition (in mol %, with respect to the total moles of recurring units):

(i) tetrafluoroethylene (TFE): 50-80%; (per)fluoroalkylvinylethers (PAVE): 15-50%; monomer (CS-N): 0.1-10%; bis-olefin (OF): 0.05-0.2%;

(ii) tetrafluoroethylene (TFE): 20-70%; (per)fluoromethoxy-vinylethers (MOVE): 25-75%; (per)fluoroalkylvinylethers (PAVE): 0-50%; monomer (CS-N) 0.1-10%; bis-olefin (OF): 0.05-0.2%.

End chains, defects or minor amounts of monomer impurities leading to recurring units different from those above mentioned (typically, <0.1% moles, with respect to the total amount of recurring units) can be still present in the exemplary preferred fluoroelastomers (A), without this affecting properties of the material.

Still another object of the present invention is a composition which comprises fluoroelastomer (A), as above detailed, and at least one curing agent [agent (A)].

The composition (C) comprises one or more than one agent (A), as above detailed.

The said agent (A) is an agent able to promote the cross-linking of the fluoroelastomer (A) through reaction with the cure sites of monomers (CS-N) and/or (CS-C), as above described. The agent (A) may be notably a compound possessing a plurality of groups having reactivity towards the nitrile- and/or the carbo-groups of monomers (CS-N) and/or (CS-C), as above described, and/or can be a compound activating catalytically the same nitrile- and/or the carbo-groups of monomers (CS-N) and/or (CS-C) to react among each other.

The choice of the curing agent (A) is not particularly limited, and one of ordinary skills in the art will select the most suitable curing agent (A) depending on the nature of the cure sites of the fluoroelastomer (A).

One or more than one agent (A) can be used in the composition of the present invention. Notably, one or more than one agent (A) may be selected among those possessing a plurality of groups having reactivity towards the nitrile- and/or the carbo-groups of monomers (CS-N) and/or (CS-C), as above described; and one or more than one agent (A) may be selected among those activating catalytically the same nitrile- and/or the carbo-groups of monomers (CS-N) and/or (CS-C) to react among each other, and one or more than one of these two types of agents (A) can be used alone or in combination in the composition of the present invention.

When the agent (A) is selected among compounds possessing catalytic activity towards activation of nitrile- and/or the carbo-groups of monomers (CS-N) and/or (CS-C), as above described, the agent (A) is referred to as an agent (A$_{cat}$), and can be notably selected from the group consisting of:

an organic ammonia-generating compound, that is to say a compound able to generate ammonia upon heating (e.g. in conditions such as those encountered during curing/post-cure);

an organotin compound, such as notably allyl-propargyl-, triphenyl-, and allenyl-tin curatives, with tetraalkyl or tetraaryl tin compounds being preferred.

Agent (A$_{cat}$) is preferably selected from the group consisting of:

(A$_{cat}$-1): (thio)urea compounds of formula (U) and salts thereof:

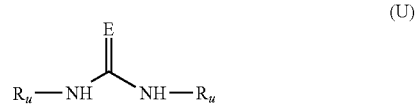

(U)

wherein E is O or S, preferably E is O, and each of R$_u$, equal to or different from each other, is independently selected from the group consisting of hydrogen and C$_1$-C$_6$ hydrocarbon groups (in particular C$_1$-C$_6$ alkyl groups);

(A$_{cat}$-2): cyclic addition products of ammonia or primary amine and aldehyde;

(A$_{cat}$-3): (thio)carbamates of formula (C):

(C)

wherein E is oxygen or sulphur; $R_b$ is a $C_1$-$C_{36}$ hydrocarbon group, and Rc is H or a $C_1$-$C_6$ alkyl group;

($A_{cat}$-4): ammonium salts of organic and inorganic acids, notably selected from the group consisting of (j) ammonium (preferably fluorine-containing) carboxylates; (jj) ammonium (preferably fluorine-containing) sulfonates; (jjj) ammonium (preferably fluorine alkyl group-containing) phosphates, phosphonates or sulfonates; (jv) ammonium salts of sulfuric acid, carbonic acid, nitric acid and phosphoric acid.

Among suitable agents ($A_{cat}$):

($A_{cat}$-1): (thio)urea compounds, as above detailed, are preferably selected from the group consisting of ($A_{cat}$-1-A) (thio)ureas of formula (U-2):

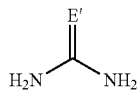

(U2)

wherein E' is O or S;

($A_{cat}$-2): cyclic addition products of ammonia or primary amine and aldehyde, as above detailed, are preferably selected from the group consisting of:

($A_{cat}$-2-A) cyclic aldehyde adducts trimers of formula (T):

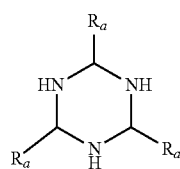

(T)

wherein each of $R_a$, equal to or different from each other, is selected from the group consisting of hydrogen and $C_1$-$C_6$ hydrocarbon groups (in particular $C_1$-$C_6$ alkyl groups);

($A_{cat}$-2-B) hexamethylene tetramine of formula:

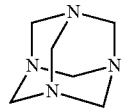

(which is known to be the result of addition of ammonia on formaldehyde);

($A_{cat}$-3): (thio)carbamates, as above detailed, are preferably selected from the group consisting of ($A_{cat}$-3-A) carbamates of formula (C-1):

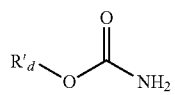

(C-1)

wherein $R'_d$ is a $C_1$-$C_{36}$ hydrocarbon group, preferably is a optionally substituted benzyl group.

Agents ($A_{cat}$) which have been found particularly useful in the composition of the present invention are the following:

($A_{cat}$-1) Urea of formula:

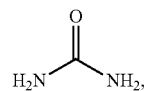

which is the preferred option in terms of costs/availability/reactivity;

($A_{cat}$-2) Acetaldehyde ammonia trimer of formula:

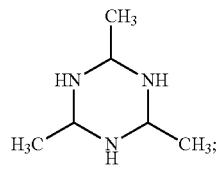

($A_{cat}$-3) Hexamethylenetetramine of formula:

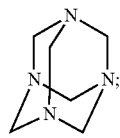

($A_{cat}$-4) Benzyl carbamate of formula:

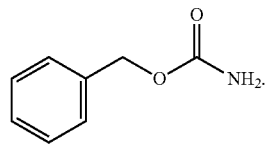 [SMILES: NC(=O)OCc1ccccc1]

When the agent (A) is selected among compounds possessing a plurality of groups having reactivity towards the nitrile- and/or the carbo-groups of monomers (CS-N) and/or (CS-C), as above described, the agent (A) is referred to as an agent ($A_{func}$), and can be notably selected from the group consisting of:

($A_{func}$-1) bis-amino(thio)phenol compounds [aminophenol (AP)] of formula:

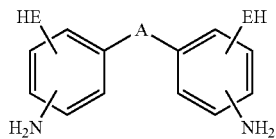

wherein:

A is a bond, —$SO_2$—, —O—, —C(O)—, or a (fluoro)alkyl of 1 to 10 carbon atoms (specifically a perfluoroalkyl of 1 to 10 carbon atoms, e.g. —$C(CF_3)_2$—);

each of E, equal of different at each occurrence, is oxygen or sulphur, preferably oxygen, and wherein the amino and -EH groups are interchangeably in ortho, meta or para positions with respect to the group A;

($A_{func}$-2) aromatic tetraamine compounds [amine (TA)] of formula:

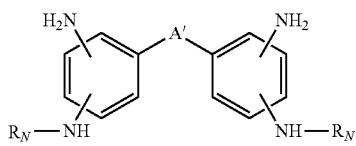

wherein:
A' is a bond, —SO$_2$—, —O—, —C(O)—, (fluoro)alkyl of 1 to 10 carbon atoms (specifically a perfluoroalkyl of 1 to 10 carbon atoms, e.g. —C(CF$_3$)$_2$—);
each of R$_N$, equal to or different from each other, is a hydrogen atom or a C$_1$-C$_{12}$ hydrocarbon group, preferably an aryl group; and
the amino groups are interchangeably in ortho, meta or para positions with respect to the group A', (A$_{func}$-3) bis-amidoxime/amidine/amidrazone compounds of formula:

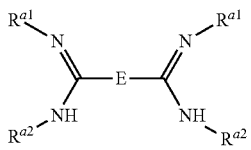

wherein Rai is —OH or —H, and Rae is H or NH$_2$, and E is a C$_1$-C$_{18}$ divalent group, optionally comprising fluorine atoms;

(A$_{func}$-4) bis-imidoylamidine compounds of formula:

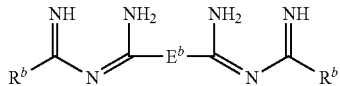

wherein E$^b$ is a C$_1$-C$_{18}$ divalent group, optionally comprising fluorine atoms, and R$^b$ is a C$_1$-C$_{12}$ group, optionally fluorinated.

Among bis-amidoxime/amidine/amidrazone compounds (A$_{func}$-3) as above detailed, mention can be notably made of:

(A$_{func}$-3-A): fluorinated bis-amidoxime compounds of formula:

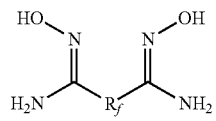

wherein Rf is a divalent fluorinated alkylidene group, preferably a group of formula —(CF$_2$)$_n$—, with n being 1 to 10, or wherein R$_f$ is a (per)fluorooxyalkylene group, preferably a group selected from —(CFX)$_p$ (OCF$_2$CFX)$_n$(OCFX)$_m$O—(CFX)$_p$—, with X being F or —CF3; n, m being zero or integers, with the proviso that n+m is from 1 to 100; and m being 1 or 2.

(A$_{func}$-3-B) aromatic bis-amidoxime compounds of formula:

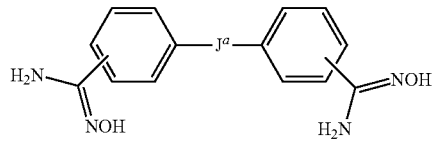

wherein J$^a$ is a bond, —SO$_2$—, —O—, —C(O)—, (fluoro)alkyl of 1 to 10 carbon atoms (specifically a perfluoroalkyl of 1 to 10 carbon atoms, e.g. —C(CF$_3$)$_2$—);

(A$_{func}$-3-C): fluorinated bis-amidrazone compounds of formula:

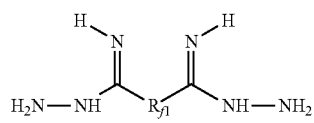

wherein R$_f$ is a divalent fluorinated alkylidene group, preferably a group of formula —(CF$_2$)$_n$—, with n being 1 to 10, or wherein R$_f$ is a (per)fluorooxyalkylene group, preferably a group selected from —(CFX)$_p$ (OCF$_2$CFX)$_n$(OCFX)$_m$O—(CFX)$_p$—, with X being F or –CF$_3$; n, m being zero or integers, with the proviso that n+m is from 1 to 100; and m being 1 or 2.

(A$_{func}$-3-D) aromatic bis-amidrazone compounds of formula:

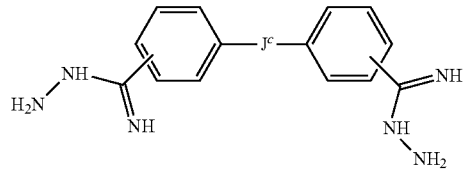

wherein J$^c$ is a bond, —SO$_2$—, —O—, —C(O)—, (fluoro)alkyl of 1 to 10 carbon atoms (specifically a perfluoroalkyl of 1 to 10 carbon atoms, e.g. —C(CF$_3$)$_2$—).

Agent (A) is preferably an agent (A$_{func}$), as described above, and more preferably an agent (A$_{func}$-1), described above, i.e. a bis-amino(thio)phenol compound or aminophenol (AP).

The aminophenol (AP) can be selected from the group consisting of 4,4'-[2,2,2-trifluoro-1-(trifluoromethyl)-ethylidene]bis(2-aminophenol); 4,4'-sulfonylbis(2-aminophenol); 3,3'-diaminobenzidine, 3,3',4,4'-tetraaminobenzophenone.

Particularly preferred aminophenol (AP) is 4,4'-[2,2,2-trifluoro-1-(trifluoromethyl)-ethylidene]bis(2-aminophenol), otherwise known as bis-aminophenol AF, having formula:

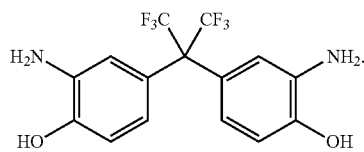 [SMILES: Nc1cc(C(c2ccc(O)c(N)c2)(C(F)(F)F)C(F)(F)F)ccc1O]

The composition (C) may further additionally comprise ingredients which may be commonly used for curing of fluoroelastomers; more specifically, composition (C) may generally further comprise (a) one or more than one metallic basic compound, in amounts generally of from 0.5 to 15 phr, and preferably of from 1 to 10 phr, relative to 100 weight parts of fluoroelastomer (A); metallic basic compounds are generally selected from the group consisting of (j) oxides or hydroxides of divalent metals, for instance oxides or hydroxides of Mg, Zn, Ca or Pb, and (jj) metal salts of a weak acid, for instance Ba, Na, K, Pb, Ca stearates, benzoates, carbonates, oxalates or phosphites;

(b) one or more than one acid acceptor which is not a metallic basic compound, in amounts generally of from 0.5 to 15 phr, and preferably of from 1 to 10 phr, relative to 100 weight parts of fluoroelastomer (A); these acid acceptors are generally selected from nitrogen-containing organic compounds, such as 1,8-bis (dimethylamino)naphthalene, octadecylamine, etc., as notably described in EP 708797 A (DU PONT) Jan. 5, 1996;

(c) other conventional additives, such as fillers, thickeners, pigments, antioxidants, stabilizers, processing aids, and the like.

Among fillers, fluorinated reinforcing fillers consisting of fluoroplastic, in particular of nanometric size, can be advantageously used. Hence, the composition of the invention, according to certain embodiments, may comprise at least one semi-crystalline fluoropolymer, generally in an amount of from 10 to 70 weight parts, preferably from 12 to 60 weight parts, relative to 100 weight parts of fluoroelastomer (A); the said semi-crystalline fluoropolymer is generally selected from the group consisting of tetrafluoroethylene (TFE) homopolymers and copolymers of TFE with one or more monomers containing at least one unsaturation of ethylenic type, in an amount of from 0.01 to 10 mol % and preferably from 0.05 to 7 mol %. Within this frame, particularly preferred are semi-crystalline TFE copolymers comprising recurring units derived from at least one (per) fluoroalkylvinylethers (PAVE) of formula $CF_2=CFOR_f$, wherein $R_f$ is a $C_1$-$C_6$ (per)fluoroalkyl group, preferably $CF_3$, $C_2F_5$, $C_3F_7$. From morphological perspective, the semi-crystalline fluoropolymers preferred for these embodiment's are those which possess an average particle size of between 10 and 400 nm, preferably of 10 to 250 nm, even more preferably of 10 to 100 nm.

The invention also pertains to a method for fabricating shaped articles comprising curing the composition (C), as above described.

The composition (C) can be fabricated, e.g. by moulding (injection moulding, extrusion moulding), calendering, or extrusion, into the desired shaped article, which is advantageously subjected to vulcanization (curing) during the processing itself and/or in a subsequent step (post-treatment or post-cure), advantageously transforming the relatively soft, weak, fluoroelastomeric uncured composition into a finished article made of non-tacky, strong, insoluble, chemically and thermally resistant cured fluoroelastomer material.

Yet, the invention pertains to cured articles obtained from the composition (C), as above detailed. Said cured articles are generally obtained by moulding and curing the fluoroelastomer composition, as above detailed. These cured articles may be sealing articles, including O(square)-rings, packings, gaskets, door sleeves, diaphragms, shaft seals, valve stem seals, piston rings, crankshaft seals, cam shaft seals, and oil seals or may be piping and tubings, in particular sealing parts or other items includes in semiconductor manufacturing devices.

Further in addition, the invention pertains to a method for processing the composition (C), as above detailed, according any of injection moulding, compression moulding, extrusion moulding, coating, screen printing technique, form-in-place technique.

Should the disclosure of any of the patents, patent applications, and publications that are incorporated herein by reference conflict with the present description to the extent that it might render a term unclear, the present description shall take precedence.

The present invention will be now described in more detail with reference to the following examples, whose purpose is merely illustrative and not limitative of the scope of the invention.

Raw Materials

Bis-aminophenol AF (BOAP, herein after) was supplied from Apollo Scientific and used as received.

Determination of Storage Modulus at 140° C.

$G'_{0.1}$ and $G'_1$, i.e. the values of the storage modulus, as measured by dynamic rheology at a temperature of 140° C. according to ASTM D4440 at a shear rate, respectively, of 0.1 rad/sec and 1 rad/sec, were determined using instrument Rubber Process Analyzer RPA 2000, supplied by Alpha Technologies.

Preparative Example 1

In a 5 litres reactor equipped with a mechanical stirrer operating at 630 rpm, 3.1 l of demineralized water and 31 ml of a microemulsion, previously obtained by mixing 7.4 ml of a perfluoropolyoxyalkylene having acidic end groups of formula: $CF_2ClO(CF_2—CF(CF_3)O)_n(CF_2O)_mCF_2COOH$, wherein n/m=10, having average molecular weight of 600, 1.9 ml of a 30% v/v $NH_4OH$ aqueous solution, 17.4 ml of demineralised water and 4.3 ml of GALDEN® D02 perfluoropolyether of formula: $CF_3O(CF_2CF(CF_3)O)_n(CF_2O)_mCF_3$ with n/m=20, having average molecular weight of 450, were introduced.

Then 2.5 g of 1,4-diiodoperfluorobutane ($C_4F_8I_2$) as chain transfer agent and 21 g of 8-CNVE were introduced, and the reactor was heated and maintained at a set-point temperature of 80° C.; a mixture of tetrafluoroethylene (TFE) (38% moles) and perfluoromethylvinylether (MVE) (62% moles) was then added to reach a final pressure of 21 bar (2.1 MPa). 1.6 g of ammonium persulfate (APS) as initiator were then introduced. Pressure was maintained at set-point of 21 bar by continuous feeding of a gaseous mixture of TFE (60% moles) and MVE (40% moles) up to a total of 1350 g, and of a combination of 43 g of 8-CNVE and 3.8 g of 1,6-divinylperfluorohexane (DO), was added stepwise in 20 portions, each 5% increase in conversion starting from the beginning of the polymerization. Then the reactor was cooled, vented and the latex recovered. The latex was coagulated with nitric acid as a coagulation agent, and the polymer separated from the aqueous phase, washed with demineralised water and dried in a convection oven at 120° C. for 24 hours.

The composition of the obtained polymer from NMR analysis was found to be: TFE 65.7% mol, MVE 33.3% mol, 8-CNVE 1.0% mol, and the Mooney viscosity at 121° C. is 101 MU. This fluoroelastomer was found to possess a content of long chain branches so as to provide for a ratio $G'_{0.1}/G'_1$ of 2.05, when determined by dynamic rheology, as described above.

Comparative Preparative Example 2

Example 1 was repeated except for a total addition of 7.6 g of DO in 20 portions each 5% increase in conversion starting from the beginning of the polymerization. The composition of the obtained polymer from NMR analysis was found to be: TFE 65.1% mol, MVE 33.9% mol, 8-CNVE 1.0% mol, and the Mooney viscosity at 121° C. is 115 MU. This fluoroelastomer was found to possess a content of long chain branches so as to provide for a ratio $G'_{0.1}/G'_1$ of 1.56, when determined by dynamic rheology, as described above.

Comparative Preparative Example 3

Example 1 was repeated except for a total addition of 1.9 g of DO in 20 portions each 5% increase in conversion starting from the beginning of the polymerization. The composition of the obtained polymer from NMR analysis was found to be: TFE 65.9% mol, MVE 33.1% mol, 8-CNVE 1.0% mol, and the Mooney viscosity at 121° C. is 82 MU. This fluoroelastomer was found to possess a content of long chain branches so as to provide for a ratio $G'_{0.1}/G'_1$ of 2.35, when determined by dynamic rheology, as described above.

Comparative Preparative Example 4

Example 1 was repeated except a mixture of TFE (34.5% moles) and MVE (65.5% moles) was used to reach a pressure of 21 bar (2.1 MPa) in the initial pressurization phase, then pressure was maintained at set-point of 21 bar by continuous feeding of a gaseous mixture of TFE (57.5% moles) and MVE (42.5% moles) up to a total of 1350 g, and no DO was fed to the reactor. The composition of the obtained polymer from NMR analysis was found to be: TFE 61.9% mol, MVE 37.1% mol, 8-CNVE 1.0% mol, and the Mooney viscosity at 121° C. is 60 MU. This linear fluoroelastomer, essentially free from long chain branches, was found to possess a ratio $G'_{0.1}/G'_1$ of 3.82, when determined by dynamic rheology, as described above.

General Compounding and Curing Procedure

The fluoroelastomers prepared as described above were compounded with 20 phr of carbon black Cancarb N 990 MT and 0.70 phr of BOAP in a two rolls open mill. Plaques were cured in a pressed mould and then post-treated in an air circulating oven in conditions detailed in Table below. Cure behaviour was characterized by Moving Die Rheometer (MDR), at 170° C., by determining the following properties:

$M_L$=Minimum torque (lb×in)
$M_H$=Maximum torque (lb×in)
$t_{S2}$=Scorch time, time for two units rise from $M_L$ (sec);
$t_{50}$=Time to 50% state of cure (sec);
$t_{90}$=Time to 90% state of cure (sec);

The tensile properties have been determined on specimens punched out from the plaques, according to the ASTM D 412 C Standard, after post-cure.

TS is the tensile strength in MPa;
$M_{100}$ is the modulus in MPa at an elongation of 100%;
E.B. is the elongation at break in %.

Compression set (CS) values have been determined on O-rings (#214 class) according to the ASTM D 395-B method at temperatures ranging from 200° C. to 360° C.; values in the table are the average of determinations made on 4 specimens. The qualification "broken" is representative of determinations where all specimens experienced critical failures and were not suitable for determining residual deformation.

TABLE 1

| Ingredient | | Ex. 1 | Ex. 20 | Ex. 30 | Ex. 40 |
|---|---|---|---|---|---|
| elastomer | wt parts | 100 | 100 | 100 | 100 |
| $G_{0.1}'/G_1'$ | | 2.05 | 2.35 | 1.56 | 3.82 |
| N 990 MT | wt parts | 20 | 20 | 20 | 20 |
| BOAP | wt parts | 0.70 | 0.70 | 0.70 | 0.70 |

TABLE 2

| Sample | | Ex. 1 | Ex. 20 | Ex. 30 | Ex. 40 |
|---|---|---|---|---|---|
| $M_L$ | (N×m) | 0.4 | 0.4 | 0.3 | 0.3 |
| $M_H$ | (N×m) | 9.4 | 10.5 | 7.9 | 8.8 |
| $t_{s2}$ | (s) | 329.0 | 243.0 | 186.0 | 96.0 |
| $t_{50}$ | (s) | 408.0 | 332.0 | 351.0 | 144.0 |
| $t_{90}$ | (s) | 567.0 | 758.0 | 1107.0 | 726.0 |
| $t_{95}$ | (s) | 630.0 | 988.0 | 1289.0 | 1161.0 |
| Molding Conditions: 30 min at 170° C. | | | | | |
| Post-cure Conditions: (8 + 16)h @ 290° C. | | | | | |
| Mechanical Properties ASTM D4120 | | | | | |
| TS | (M Pa) | 18.9 | 17.9 | 18.2 | 18.5 |
| $M_{100}$ | (M Pa) | 8.5 | 10.3 | 6.9 | 5.1 |
| E.B. | (%) | 157 | 131 | 184 | 191 |
| Hardness | (Shore A) | 66 | 69 | 64 | 65 |
| Compression Set after 70 hours at different temperatures | | | | | |
| 200° C. | (%) | 12 | 10 | 11 | 10 |
| 300° C. | (%) | 18 | 15 | 19 | 16 |
| 316° C. | (%) | 21 | broken | 27 | 31 |
| 330° C. | (%) | 41 | broken | 71 | broken |
| 340° C. | (%) | 61 | broken | broken | broken |
| 350° C. | (%) | 83 | broken | broken | broken |
| Compression Set after 24 hours at different temperatures | | | | | |
| 350° C. | (%) | 43 | broken | broken | broken |
| 360° C. | (%) | 75 | broken | broken | broken |

The invention claimed is:

1. A (per)fluoroelastomer [fluoroelastomer (A)] having a branched structure including long chain branches, said fluoroelastomer (A) comprising:
   recurring units derived from tetrafluoroethylene (TFE); and
   from 0.1 to 10.0% moles, with respect to total moles of recurring units of (per)fluoroelastomer (A), of recurring units derived from at least one of:
      cure-site containing monomers having at least a nitrile group [monomer (CS-N)];
      cure-site containing monomers having at least a carbo-group [monomer (CS-C)] selected from the group consisting of carboxylic groups —COOH; carboxylate groups —COOX$_a$, with X$_a$ being a monovalent metal or an ammonium group; carboxamide group —CONH$_2$; and alkoxycarboxylic group —COO—R$_H$, with R$_H$ being a (fluoro) (hydro) carbon group;
   and comprising an amount of long chain branches so that the ratio $G'_{0.1}/G'_1$ satisfies the following inequality:

$$1.75 \leq G'_{0.1}/G'_1 \leq 2.25$$

wherein:
   $G'_{0.1}$ and $G'_1$ are the values of the storage modulus, as measured by dynamic rheology at a temperature of 140° C. according to ASTM D4440 at a shear rate, respectively, of 0.1 rad/sec and 1 rad/sec.

2. The fluoroelastomer (A) of claim 1, wherein:
cure-site containing monomers of type (CS-C) are selected from the group consisting of:
(CS-C1) perfluorovinyl ethers containing carbo-groups of formula $CF_2=CF-(OCF_2CFX^C)_m-O-(CF_2)_n-R_{COX}$, with $X^C$ being F or $CF_3$, m being 0, 1, 2, 3 or 4; n being an integer from 1 to 12, and $R_{COX}$ being selected from the group consisting of carboxylic groups —COOH; carboxylate groups —COOX$_a$, with $X_a$ being a monovalent metal or an ammonium group; carboxamide group —$CONH_2$; and alkoxycarboxylic group —COO—$R_H$, with $R_H$ being a (fluoro) (hydro) carbon group;
(CS-C2) perfluorovinyl ethers containing carbo-groups of formula $CF_2=CF-(OCF_2CFX^C)_{m'}-O-CF_2-CF(CF_3)-R_{COX}$, with m' being 0, 1, 2, 3 or 4, and $X_C$ and $R_{COX}$ having the meaning as defined for (CSC-1); and/or
cure-site containing monomers of type (CS-N) are selected from the group consisting of:
(CS-N1) perfluorovinyl ethers containing nitrile groups of formula $CF_2=CF-[OCF_2CFX^{CN}(CF_2)_{a1}]_m-O-(CF_2)_n-CN$, with $X^{CN}$ being F or $CF_3$, a1 being 0, 1 or 2; m being 0, 1, 2, 3 or 4; n being an integer from 1 to 12;
(CS-N2) perfluorovinyl ethers containing nitrile groups of formula $CF_2=CF-(OCF_2CFX^{CN}(CF_2)_{a2})_{m'}-O-CF_2-CF(CF_3)-CN$, with $X^{CN}$ being F or $CF_3$, a2 being 0, 1 or 2; m' being 0, 1, 2, 3 or 4.

3. The fluoroelastomer (A) of claim 1, comprising cure-site containing monomers having at least a nitrile group [monomer (CS-N)].

4. The fluoroelastomer (A) of claim 3, wherein said cure-site monomer (CS-N) is selected from the group consisting of perfluoro (8-cyano-5-methyl-3,6-dioxa-1-octene) of formula: $CF_2=CF-O-CF_2-CF(CF_3)-O-CF_2-CF_2-CN$ (8-CNVE) and the monomer of formula $CF_2=CF-O-CF_2-CF_2-CF_2-O-CF_2-CF(CF_3)-CN$, and mixtures thereof.

5. The fluoroelastomer (A) of claim 1, wherein fluoroelastomer (A) comprises recurring units derived from at least one (per) fluorinated monomer, in addition to recurring units derived from tetrafluoroethylene, and recurring units derived from monomer (CS-N) and/or (CS-C), wherein said (per)fluorinated monomer is selected from the group consisting of:
$C_3$-$C_8$ perfluoroolefins, such as notably hexafluoropropene (HFP);
$C_2$-$C_8$ hydrogen-contaning fluoroolefins;
(per)fluoroalkylethylenes complying with formula $CH_2=CH-R_{f0}$, in which $R_{f0}$ is a $C_1$-$C_6$ (per)fluoroalkyl or a $C_1$-$C_6$ (per)fluorooxyalkyl having one or more ether groups;
chloro- and/or bromo- and/or iodo-containing $C_2$-$C_6$ fluoroolefins;
(per)fluoroalkylvinylethers complying with formula $CF_2=CFOR_{f1}$ in which $R_{f1}$ is a $C_1$-$C_6$ fluoro- or perfluoroalkyl;
(per)fluoro-oxyalkylvinylethers complying with formula $CF_2=CFOX_0$, in which $X_0$ is a
$C_1$-$C_{12}$ (per)fluorooxyalkyl having one or more ether groups;
$C_2F_5$, —$C_3F_7$ or a $C_1$-$C_6$ (per)fluorooxyalkyl having one or more ether groups;
(per)fluorodioxoles, of formula:

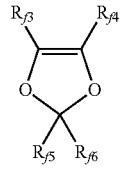

wherein each of $R_{f3}$, $R_{f4}$, $R_{f5}$, $R_{f6}$, equal to or different from each other, is independently a fluorine atom, a $C_1$-$C_6$ fluoro- or per (halo) fluoroalkyl, optionally comprising one or more oxygen atom.

6. The fluoroelastomer (A) of claim 5, wherein the fluoroelastomer (A) is a TFE-based copolymer comprising recurring units derived from TFE, recurring units derived from monomer (CS-N) and/or monomer (CS-C), and recurring units derived from at least one additional fluorinated comonomer selected from the group consisting of:
(a) $C_3$-$C_8$ perfluoroolefins, such as hexafluoropropylene (HFP);
(b) $C_2$-$C_8$ fluoroolefins comprising at least one of iodine, chlorine and bromine;
(d) (per)fluoroalkylvinylethers (PAVE) of formula $CF_2=CFOR_f$ wherein $R_f$ is a $C_1$-$C_6$ (per)fluoroalkyl group;
(e) (per)fluoro-oxy-alkylvinylethers of formula $CF_2=CFOX$, wherein X is a $C_1$-$C_{12}$ (per)fluoro-oxyalkyl comprising catenary oxygen atoms;
(f) (per)fluorodioxoles having formula:

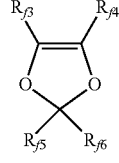

wherein each of $R_{f3}$, $R_{f4}$, $R_{f5}$, $R_{f6}$, equal to or different from each other, is independently selected from the group consisting of fluorine atom and $C_1$-$C_6$ (per) fluoroalkyl groups,
optionally comprising one or more than one oxygen atom.

7. The fluoroelastomer (A) of claim 6, wherein the (per)fluoro-oxy-alkylvinylethers are (e') (per)fluoro-methoxy-vinylethers (MOVE) having formula:

$CF_2=CFOCF_2OR_{f2}$ wherein $R_{f2}$ is selected from the group consisting of $C_1$-$C_6$ (per)fluoroalkyls; $C_5$-$C_6$ cyclic (per)fluoroalkyls; and $C_2$-$C_6$ (per)fluorooxyalkyls, comprising at least one catenary oxygen atom.

8. The fluoroelastomer (A) of claim 1, said fluoroelastomer (A) comprising recurring units derived from a bis-olefin [bis-olefin (OF)] having general formula:

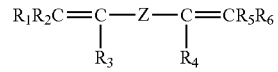

wherein $R_1$, $R_2$, $R_3$, $R_4$, $R_5$ and $R_6$, equal or different from each other, are independently selected from the group consisting of F, Cl, H, $C_1$-$C_5$ (fluoro) alkyl groups, and groups $OR_B$, wherein $R_B$ is a branched or straight chain alkyl radical which can be partially, substantially or completely fluorinated or chlorinated; Z is a linear or branched $C_1$-$C_{18}$ (hydro) carbon radical (including alkylene or cycloalkylene radical), optionally containing oxygen atoms or a (per)fluoro (poly) oxyalkylene radical comprising one or more catenary ethereal bonds.

9. The fluroelastomer (A) of claim 8; and wherein said bis-olefin (OF) is selected from the group consisting of those complying with formulae (OF-1), (OF-2) and (OF-3):

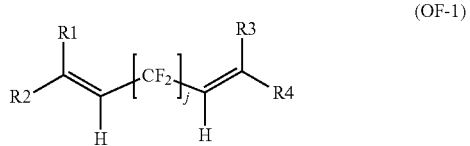

(OF-1)

wherein j is an integer between 2 and 10, and $R_1$, $R_2$, $R_3$, $R_4$, equal or different from each other, are H, F or $C_{1-5}$ alkyl or (per)fluoroalkyl group;

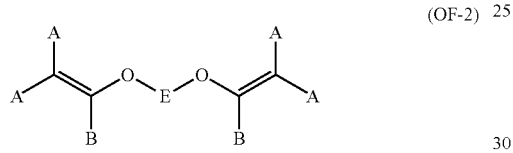

(OF-2)

wherein each of A, equal or different from each other and at each occurrence, is independently selected from F, Cl, and H; each of B, equal or different from each other and at each occurrence, is independently selected from F, Cl, H and $OR_B$, wherein $R_B$ is a branched or straight chain alkyl radical which can be partially, substantially or completely fluorinated or chlorinated; E is a divalent group having 2 to 10 carbon atom, optionally fluorinated, which may be inserted with ether linkages;

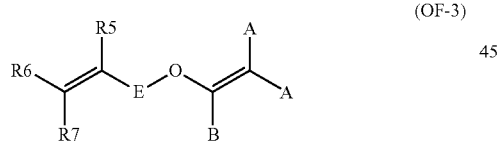

(OF-3)

wherein E, A and B have the same meaning as above defined; R5, R6, R7, equal or different from each other, are H, F or $C_{1-5}$ alkyl or (per)fluoroalkyl group.

10. The fluoroelastomer (A) of claim 1, wherein fluoroelastomer (A) comprises long chain branches, in an amount such that the ratio $G'_{0.1}/G'_1$ is of at least 1.80.

11. A composition [composition (C)] comprising fluoroelastomer (A), according to claim 1, and at least one curing agent [agent (A)].

12. The composition (C) according to claim 11, wherein the agent (A) is selected
among compounds possessing catalytic activity towards activation of nitrile- and/or the carbo-groups of monomers (CS-N) and/or (CS-C), and wherein the agent (A) is referred to as an agent ($A_{cat}$), and is selected from the group consisting of:
an organic ammonia-generating compound that is able to generate ammonia upon heating;
an organotin compound.

13. The composition according to claim 12, wherein the agent ($A_{cat}$) is selected from the group consisting of:
($A_{cat}$-1): (thio) urea compounds of formula (U) and salts thereof:

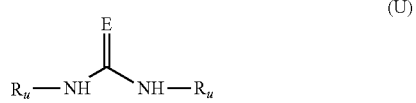

(U)

wherein E is O or S, and each of Ru, equal to or different from each other, is independently selected from the group consisting of hydrogen and $C_1$-$C_6$ hydrocarbon groups (in particular $C_1$-$C_6$ alkyl groups);
($A_{cat}$-2): cyclic addition products of ammonia or primary amine and aldehyde;
($A_{cat}$-3): (thio) carbamates of formula (C):

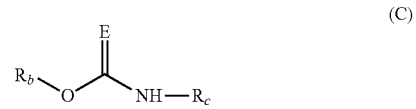

(C)

wherein E is oxygen or sulphur; $R_b$ is a C1-C36 hydrocarbon group, and $R_c$ is H or a $C_1$-$C_6$ alkyl group; and
($A_{cat}$-4): ammonium salts of organic and inorganic acids.

14. The composition according to claim 13, wherein the ammonium salts of organic and inorganic acids is selected from the group consisting of (j) ammonium carboxylates; (jj) ammonium sulfonates; (jjj) ammonium phosphates, phosphonates or sulfonates; (jv) ammonium salts of sulfuric acid, carbonic acid, nitric acid and phosphoric acid; and wherein
the agent ($A_{cat}$) is selected from the group consisting of:
($A_{cat}$-1): (thio) urea compounds selected from the group consisting of ($A_{cat}$-1-A) (thio) ureas of formula (U-2):

(U2)

wherein E' is O or S;
($A_{cat}$-2): cyclic addition products of ammonia or primary amine and aldehyde selected from the group consisting of:
($A_{cat}$-2-A) cyclic aldehyde adducts trimers of formula (T):

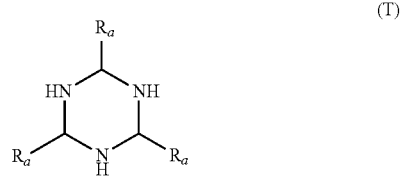

(T)

wherein each of $R_a$, equal to or different from each other, is selected from the group consisting of hydrogen and C1-C6 hydrocarbon groups;

($A_{cat}$-2-B) hexamethylene tetramine of formula:

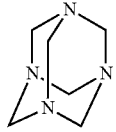

($A_{cat}$-3): (thio) carbamates selected from the group consisting of ($A_{cat}$-3-A) carbamates of formula (C-1):

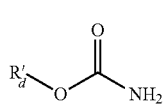

(C-1)

wherein R'a is a C1-C36 hydrocarbon group.

15. The composition (C) of claim 12, wherein the agent (A) is selected among compounds possessing a plurality of groups having reactivity towards the nitrile- and/or the carbo-groups of monomers (CS-N) and/or (CS-C) and wherein the agent (A) is referred to as an agent (Afunc), and is selected from the group consisting of:

($A_{func}$-1) bis-amino (thio) phenol compounds [aminophenol (AP)] of formula:

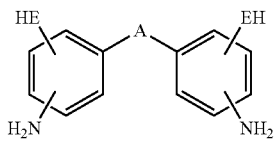

wherein:
  A is a bond, —SO$_2$—, —O—, —C(O)—, or a (fluoro) alkyl of 1 to 10 carbon atoms;
  each of E, equal of different at each occurrence, is oxygen or sulphur, and wherein the amino and -EH groups are interchangeably in ortho, meta or para positions with respect to the group A;

($A_{func}$-2) aromatic tetraamine compounds [amine (TA)] of formula:

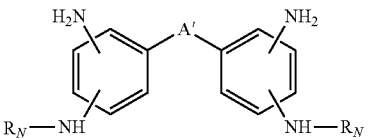

wherein:
  A' is a bond, —SO$_2$—, —O—, —C(O)—, or a (fluoro) alkyl of 1 to 10 carbon atoms;
  each of $R_N$, equal to or different from each other, is a hydrogen atom or a $C_1$-$C_{12}$ hydrocarbon group; and
  the amino groups are interchangeably in ortho, meta or para positions with respect to the group A', ($A_{func}$-3) bis-amidoxime/amidine/amidrazone compounds of formula:

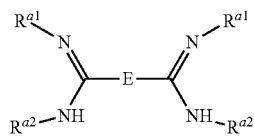

wherein $R_{a1}$ is —OH or —H, and $R_{a2}$ is H or NH$_2$, and E is a $C_1$-$C_{18}$ divalent group; optionally comprising fluorine atoms;

($A_{func}$-4) bis-imidoylamidine compounds of formula:

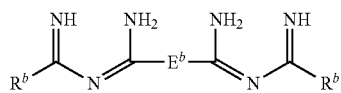

wherein $E^b$ is a $C_1$-$C_{18}$ divalent group, optionally comprising fluorine atoms, and $R^b$ is a $C_1$-$C_{12}$ group, optionally fluorinated.

16. The composition (C) according to claim 15, wherein the agent ($A_{func}$) is 4,4'-[2,2,2-trifluoro-1-(trifluoromethyl)-ethylidene]bis(2-aminophenol).

17. A method for fabricating a shaped article, said method comprising curing the composition (C), according to claim 11.

18. Cured articles obtained from the composition (C), according to claim 11, said cured articles being sealing articles, including O (square)-rings, packings, gaskets, diaphragms, shaft seals, valve stem seals, piston rings, crankshaft seals, cam shaft seals, and oil seals, piping and tubings.

* * * * *